J. H. BALDWIN.
ERASING ATTACHMENT FOR WRITING MACHINES.
APPLICATION FILED AUG. 12, 1915.
1,183,424.
Patented May 16, 1916.
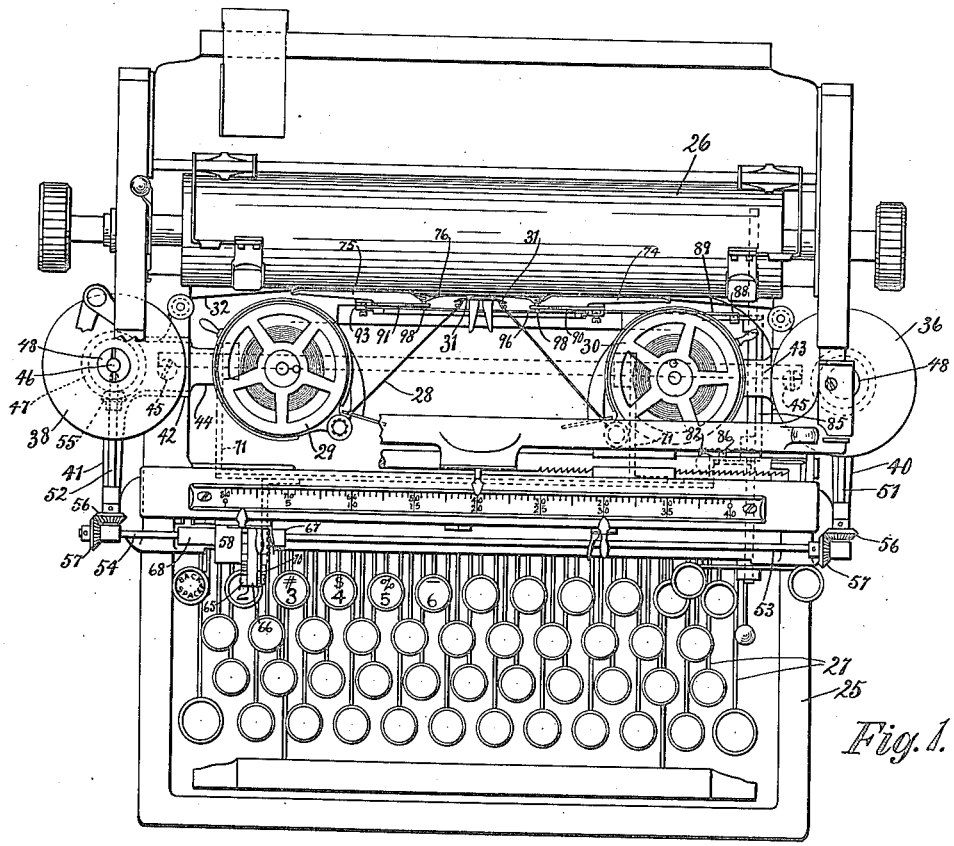
Fig. 1.
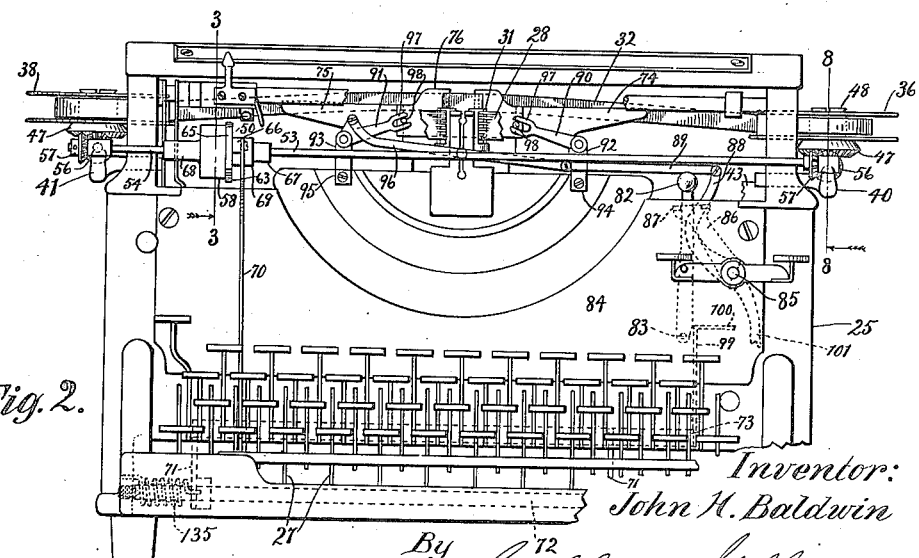
Fig. 2.
Inventor:
John H. Baldwin
By  Attys.

J. H. BALDWIN.
ERASING ATTACHMENT FOR WRITING MACHINES.
APPLICATION FILED AUG. 12, 1915.

1,183,424.

Patented May 16, 1916.
3 SHEETS—SHEET 2.

Inventor:
John H. Baldwin
By Gillson & Gillson Attys.

J. H. BALDWIN.
ERASING ATTACHMENT FOR WRITING MACHINES.
APPLICATION FILED AUG. 12, 1915.

1,183,424.

Patented May 16, 1916.
3 SHEETS—SHEET 3.

Inventor:
John H. Baldwin
By Gillson & Gillson, Attys.

UNITED STATES PATENT OFFICE.

JOHN H. BALDWIN, OF SPRINGFIELD, MISSOURI.

ERASING ATTACHMENT FOR WRITING-MACHINES.

1,183,424.

Specification of Letters Patent.

Patented May 16, 1916.

Application filed August 12, 1915. Serial No. 45,101.

*To all whom it may concern:*

Be it known that I, JOHN H. BALDWIN, a citizen of the United States, and resident of Springfield, county of Greene, and State of Missouri, have invented certain new and useful Improvements in Erasing Attachments for Writing-Machines, of which the following is a specification, and which are illustrated in the accompanying drawings, forming a part thereof.

The invention relates to typewriting machines and has for its principal object to provide such machines with appliances for obliterating written matter.

The invention accordingly contemplates a mechanism which may be incorporated in the typewriting machine or applied thereto as an attachment and which may be employed at will to render improperly written type characters illegible and permit the writing of other characters in their place, if desired.

Figure 3:
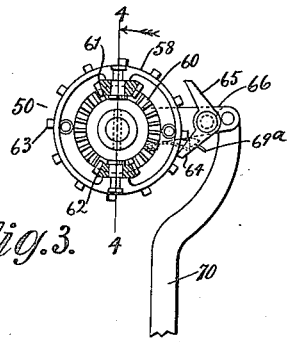
Figure 4:
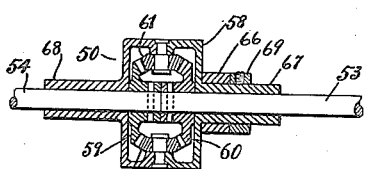
Figure 5:
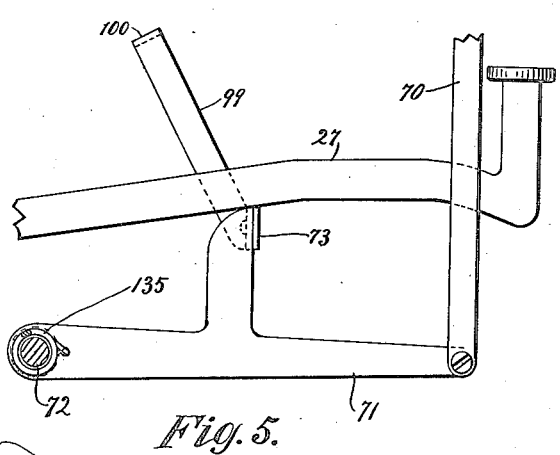
Figure 6:
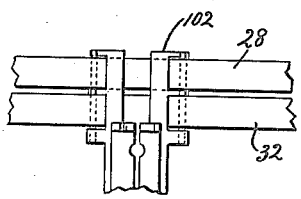
Figure 7:
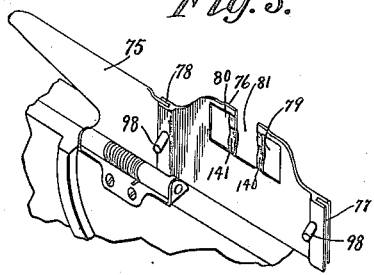
Figure 8:
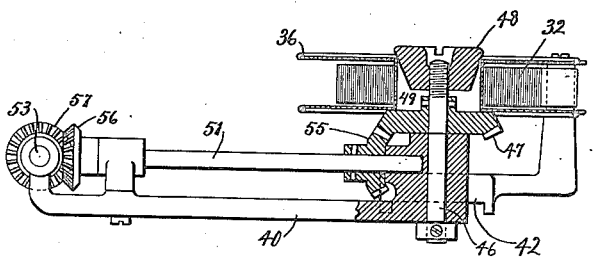
Figure 9:
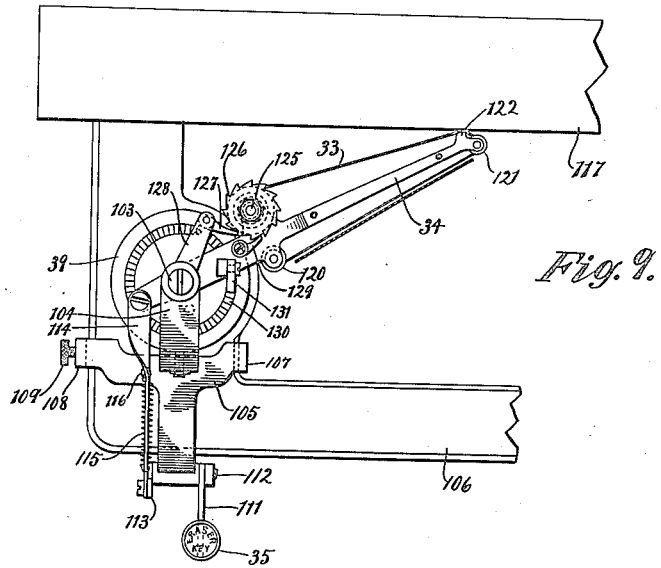
Figure 10:
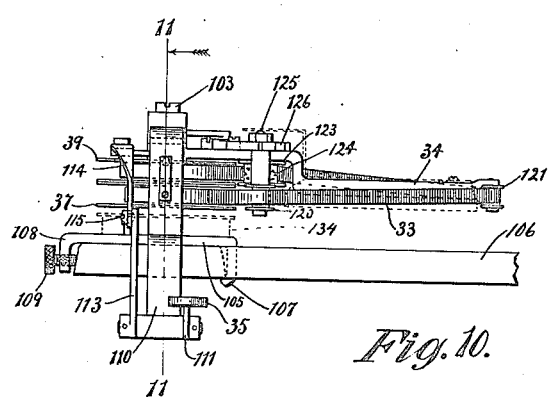
Figure 11:
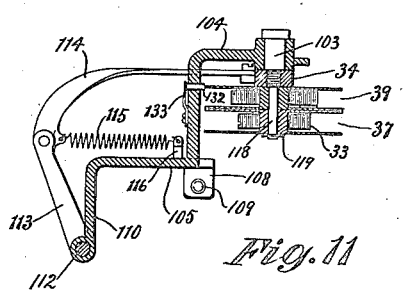
Figure 12:
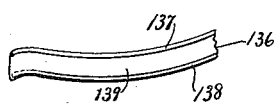

In the accompanying drawings, Figure 1 is a plan view showing a well known form of typewriting machine with mechanism provided by the invention incorporated therein, Fig. 2 is a detail front elevation of the machine illustrated in Fig. 1, Fig. 3 is a detail sectional view taken on the line 3—3 of Fig. 2, Fig. 4 is a sectional view taken on the line 4—4 of Fig. 3, Fig. 5 is a skeleton view partly in section showing a means by which the feed mechanism of the erasing attachment may be operated by the typewriting keys, Fig. 6 is a detail front elevation showing a different arrangement of some of the parts illustrated in Fig. 2, Fig. 7 is a detail perspective view of the same form of apparatus which is illustrated in Figs. 1 and 2, Fig. 8 is a detail sectional view taken on the line 8—8 of Fig. 2, Fig. 9 is a plan view showing details of the frame and platen of another well known form of typewriting machine with a modified form of apparatus provided by the invention applied thereto as a removable attachment, Fig. 10 is a detail front elevation of the parts illustrated in Fig. 9, with the location of one of the ribbon spools of the typewriter indicated by dotted lines, Fig. 11 is a detail sectional view taken on the line 11—11 of Fig. 10, and Fig. 12 is a detail perspective view showing a form of the erasing element which may be employed.

The typewriting machine which is illustrated in Figs. 1 and 2 comprises the frame generally designated 25, the platen 26 and a set of key levers 27. These parts are all of well known construction. Similarly, the typewriter ribbon is shown at 28, the ribbon spools at 29 and 30 and the vertically oscillatable carrier or plate, through which the ribbon is threaded, at 31.

It is preferred that the obliteration of typewritten matter be accomplished by the removal of portions of the surface of the paper upon which the matter appears. This may be effected by forcing an adhesive tape, as 32 or 33 against the paper and its subsequent forcible separation therefrom. The typewritten matter is thereby erased by the adhesion to the tape of those fibers of the paper upon which the inked impression has been made and their removal from the body of the paper sheet. Preferably, the tape, as 32 or 33, will be adhesive upon one side only, narrow strips of the well known surgeons' plaster being desirably employed.

In both of the forms of apparatus illustrated in Figs. 1 to 8, inclusive, the adhesive side of the tape 32 is forced against the paper at the place where an erasure is to be made by the striking of the types (not shown) against the back of the tape. For this purpose the type showing the same letter or character which is to be erased may be employed. The adhesion of the tape to the identical part of the surface of the paper which is to be removed, is accordingly insured, though such an exact register of the means employed for forcing the tape against the paper with the outline of the inked impression which is to be erased, is not usually necessary. In the form of apparatus illustrated in Figs. 9 to 11, inclusive, a lever 34, operated by a special key, as 35, is employed for forcing the tape 33 against the paper at the place where an erasure is to be made. In either case the adhesive tape 32 or 33 is preferably delivered from a spool, as 36 or 37, and the used portion of the tape is wound upon a similar spool, as 38 or 39.

In the forms of construction illustrated in Figs. 1 to 8 inclusive, the spools 36 and 38 are located at opposite sides of the machine, each being carried by a bracket, as 40 or 41. The brackets 40 and 41 are conveniently formed with channeled bases, as 42 (Fig. 8), each of which fits over the corresponding ribbon spool-supporting bracket 43 or 44 and is secured in place thereon by the same screw, as 45, which serves to unite the ribbon spool bracket 43 or 44 with the frame 25. A rotatable spindle 46 extends vertically through each of the brackets 40 and 41 and a downwardly facing beveled gear 47 is fixed upon each of these spindles above the corresponding bracket. Each spool 36, 38 is removably secured against the upper side of the corresponding beveled gear 47. For this purpose, a nut 48, having threaded engagement with the higher end of the spindle 46, is employed. As shown, each nut 48 is made tapering and enters the bore 49 of the corresponding spool, as 36, for centering the spool upon the back of the gear 47. To insure a proper relative rotation of the spools 36 and 38 for winding the tape, as 32, from one to the other regardless of changes in the effective diameters of the spools by reasons of variations in the amount of tape held thereon, the two spools are operatively connected through a differential gear mechanism generally designated 50 (Figs. 3 and 4.) As shown, each bracket 40 and 41 extends outwardly beyond the plane of the adjacent upright portion of the typewriter frame 25 and serves for supporting both ends of a short longitudinal shaft 51 or 52, as also one end of a transverse shaft 53 or 54. Each longitudinal shaft 51 and 52 carries a beveled pinion 55 which meshes with the corresponding beveled gear 47. The two relatively perpendicular shafts 51 and 53, or 52 and 54 associated with each of the brackets 41 and 42 are operatively connected by beveled gears 56, 57. The transverse shafts 53 and 54 are located in axial alinement. They enter the case 58 of the differential gear mechanism 50 from opposite sides, as through extended hubs, 67, 68, one of which is formed upon each of the side walls of the said case. Oppositely facing beveled gears 59 and 60 are fixed upon the adjacent ends of the two shafts 53, 54, within the casing 58. These gears are both operatively engaged with a pair of inwardly facing beveled pinions 61, 62, and the gears 61 and 62 are rotatably secured against the peripheral wall of the case 58 upon the inside. The feeding movement of the tape 32 is accomplished by rotating the case 58 of the differential gear mechanism 50. As shown, a set of ratchet teeth 63 is formed about the rim of the case 58 adjacent one end of the same. These ratchet teeth are adapted to be engaged by either one of a pair of integral pawls 64, 65, as by the oscillation of a crank arm 66, upon which the pawls are pivotally mounted. The crank arm 66 swings upon one of the extended hubs, as 67, of the case 58 as a pivot. It is held against longitudinal displacement thereon by a collar 69. A leaf spring 69ª which is shown as being carried by the crank arm 66, serves to hold the integral pawls 64, 65, in either one of two adjusted positions for the engagement of one or the other of the pawls with the ratchet teeth 63. When the adhesive tape 32 is to be forced against the paper by contact of the type (not shown) with the back of the tape, provision is preferably made for swinging the crank arm 66 upon the depression of any one of the key levers 27. As shown, a link 70 serves for connecting the crank arm 66 with one of the two levers 71 (Fig. 5). The levers 71 are located below the typewriter key levers 27. They are conveniently supported by being pivotally mounted upon the space bar rock shaft 72 of the typewriting machine. The two levers 71 are rigidly connected by a bar 73. This bar extends transversely beneath all of the key levers 27 (Fig. 5).

In the arrangement which is principally illustrated in Figs. 1, 2 and 7, the shield plates 74, 75, of the typewriting machine are employed for slidingly supporting a tape carrier 76 in front of the platen 26. That part of the tape 32 which extends between the spools 36, 38, is threaded through the carrier 76. This carrier is formed with vertically grooved edges 77, 78, for receiving the inner edges of the two shield plates 74 and 75. The carrier 76 is also formed with two apertures 79, 80, through which the tape is passed. Between these apertures the carrier is cut away to provide an opening 81 through which the tape is forced against the platen when struck by the type (not shown) of the typewriting machine. The carrier 76 normally occupies a position for supporting the tape below the line of the engagement of the type with the platen. When an erasure is to be made the tape is brought to operative position in front of the type characters by elevating the carrier 76. As the use of the typewriter ribbon 28 is not required during the making of an erasure, the elevation of the carrier 76 is conveniently accomplished with the same means by which the mechanism (not shown) for elevating the typewriter ribbon is rendered inoperative. For this purpose the form of typewriting machine illustrated in Figs. 1 and 2, is provided with a well known ribbon-shift lever 82. The lever 82 is pivotally supported against the inside of the upright front wall 84 of the typewriter frame, as at 83 (Fig. 2). The lever 82 is used for swinging a rock shaft 85. As shown, the rock shaft 85 is provided with a crank arm 86 and this crank arm has a bifurcated head 87 which straddles the lever 82.

In carrying out the present improvement the swinging of the rock shaft 85 by the ribbon-shift lever 82 may be made to effect the raising and lowering of the tape carrier 76. To this end it is provided with a crank arm 88. A link 89 serves for operatively connecting the crank arm 88 with one of two bell crank levers 90, 91. These bell crank levers swing in front of the shield plates 74 and 75, respectively. For this purpose they are pivotally supported on fixed brackets 92, 93. The brackets 92 and 93 may be mounted upon any convenient part of the frame 25 of the typewriting machine, as at 94, 95. The two bell crank levers 90 and 91 swing in opposite directions. To this end they are operatively connected by a link 96. Each bell crank lever 90 and 91 is in turn operatively connected with the type carrier 76. As shown, one arm of each lever 90, 91, is formed with a bifurcated head 97, and the arms of this head straddle a pin 98 which is fixed in the carrier 76 at the adjacent end of the same. The ribbon shift lever 82 is also employed to control the feeding movement of the tape 32. During the ordinary use of the typewriting machine, the bar 73 (Fig. 5) is held in a lowered position and is not operatively engaged by the key levers 27. As shown, a stop arm 92 is rigidly secured against one end of the bar 73 and extends obliquely upward therefrom. The higher end portion of the stop arm 99 is overturned, forming a head 100 which projects laterally outward as for engagement with the lower end of a crank arm 101. This crank arm is mounted on the rock shaft 85. It is brought into the path of the head 100 of the stop arm 99 by the same movement of the rock shaft 85 which accomplishes the lowering of the tape carrier 76. The crank arm 101 then serves as a stop finger for holding the bar 73 in its lowered position. The lowering of the bar 73 for the engagement of the head 100 of the stop arm 99 with the lower end of the stop finger 101, results from the first depression of any one of the key levers 27 after the movement of the stop finger 101 to the left, as viewed in Fig. 2. While the stop arm 99 is substantially rigid, the elasticity of the material from which it is formed is relied upon to permit of a slight lateral displacement of the head 100 when engaged by the stop finger 101 while the bar 73 is still in elevated position. Upon the next depression of the bar 73 the head 100 of the arm 99 slides against the side of the stop finger 101 until it passes and becomes engaged with the lower end of the stop finger.

In the arrangement illustrated in Fig. 6, the tape 32 and ribbon 28 are threaded through the same carrier, as 102. When this arrangement is used provision is made for positioning the carrier 102 either for the engagement of the types (not shown) with the back of the tape 32 or with the ribbon 28. This is accomplished by the ribbon-shift lever 82 in the same manner as is commonly employed for positioning the carrier 102 for exposing different parts of a two color ribbon to the action of the types.

In the form of construction illustrated in Figs. 9, 10 and 11, the lever 34 is mounted to swing in a horizontal plane, as by being pivotally connected by a bolt 103 to a bracket arm 104 which overhangs the spools 37 and 39. To permit the application of this form of erasing attachment to a form of typewriter which is now in common use, the bracket arm 104 is preferably formed upon a clamp 105. This clamp is constructed to be detachably secured to one of the typewriter frame members, as 106. As shown, the clamp 105 is formed with a pair of depending fingers 107, 108. One of these fingers 107 is shaped for hooked engagement with one edge of the frame member 106. The other finger, as 108 is equipped with a clamping screw 109 for engagement with the other edge of the said frame member. The clamp 105 is also formed with a depending bracket arm 110 for supporting the operating key 35. As shown, the key 35 is mounted upon the end of one of the crank arms, as 111, of a rock shaft 112 which is journaled in the lower end of a bracket arm 110. Another crank arm, as 113, of the rock shaft 112 is operatively connected with the lever 34, as by a link 114. A spring 115 reacts between the forward end of the link 114 and a stud 116 fixed in the clamp 105 for swinging the arm 34 away from the typewriter platen, as 117. The spools 37, 39, of the tape, as 33, are desirably supported above one of the typewriter ribbon spools, indicated in dotted lines, as 134, and in axial alinement with the lever 34. As shown, they are rotatably supported upon a downwardly extended portion 118 of the pivot bolt 103. The downward displacement of the spools is conveniently prevented by the use of a cotter 119. As shown, the tape 33 extends from the lower spool 37 over a pair of guide pulleys 120 and 121 carried by the lever 34 and thence about the end of the lever and over a projecting lug 122 which is formed upon the lever 34 for supporting the tape in position to contact with the paper (not shown) on the platen 117, at the end of the forward stroke of the lever. The used part of the tape 33 extends from the lug 122 over a feeding spool 123 and thence to the winding spool 39. The feeding spool 123 is desirably constructed for a firm engagement with the back of the tape, as by providing the surface of the spool with a plurality of sharpened projections or pins 124. To insure that an unused part of the tape 33 will be presented to the platen 117 at the end of each forward stroke of the lever 34, a ratchet mechanism is employed for turning the feeding spool 123. To this end the feeding spool may be fixed upon a spindle 125 which projects upwardly through the lever 34 and has a ratchet wheel 126 mounted upon its upper end. A pawl 127 is supported in position for engagement with the ratchet wheel, 126, as the lever, 34, approaches the limit of its forward stroke. As shown, the pawl 127 is pivotally secured upon a projecting part 128 of the bracket arm 104. Counter rotation of the feeding spool 123 is prevented by the use of a second pawl 129 which is mounted on the lever 34. The rotation of the winding spool 39 may be accomplished during the return movement of the lever 34. For this purpose the spool 39 has an annular set of ratchet teeth 130 formed upon its upper face. A pawl 131 is carried by the lever 34 and depends therefrom for engaging the ratchet teeth 130. Preferably the pawl 131 is formed with a rounded end for permitting it to ride over the ratchet teeth 130 when the spool 39 has been rotated through a sufficient distance to take up the slack in the tape. It is also desirable that provision be made for preventing rotation of the winding spool 39 during the forward strokes of the lever 34. As shown, a plunger 132 slides through an upright part of the bracket arm 104 and is advanced by a spring 133 for frictional engagement with the rim of the spool 39.

The operation of the form of apparatus illustrated in Figs. 9, 10 and 11, requires that the spring 115 shall be of sufficient strength for swinging the lever 34 to detach the adhesive side of the tape 33 from the paper (not shown). As the lever 34 swings about the bolt 103 as a pivot, the removal of the tape from the paper will begin at a point adjacent the outer end of the lever and proceed inwardly along the paper therefrom. The action is accordingly that of stripping off the tape and the adhering fibers of paper from one side of the area of contact between the tape and paper. Provision for protecting the unused part of the tape 33 from exposure to the air and from accidental contact therewith by the hands of the operator, or loose sheets of paper, may also be made. As shown, a sheet metal shield, so formed as to cover that part of the tape which extends between the guide rollers 120 and 121 is carried by the lever 34. In the forms of apparatus illustrated in Figs. 1 to 8, a spring conveniently shown at 135 (Fig. 5) is employed for elevating the bar 73 and link 70. To reduce the resistance to the feeding movement of the tape, as by contact of its adhesive face with the parts of the carrier 76, a tape of the form illustrated at 136, Fig. 12 may be employed. In this instance the edges 137, 138, are folded over on to the adhesive face 139 of the tape and only a portion of the adhesive face 139 is exposed. The resistance to the feeding movement of the tape is also reduced if the parts of the carrier 76 (Fig. 7) at the inner margins of the openings 79 and 89 are inwardly offset, as at 140, and 141, to permit the tape to be extended through the carrier without abrupt lateral deflection.

I claim as my invention,—

1. In an erasing device for writing machines, in combination, a platen, means for supporting a strip of adhesive material in front of the platen, and a key operated hammer operable against the back of the strip for projecting it against paper carried by the platen.

2. The combination with a writing machine, having a frame and a platen, of a clamp detachably mounted on the machine frame, a hammer pivotally mounted on the clamp to swing against the platen, winding and supply rolls carried by the clamp, a strip of erasing material extending over the hammer and having its ends wound upon the said rolls, a movable key carried by the clamp for swinging the hammer and means operated by the movement of the hammer for turning the said winding and supply rolls.

3. In an erasing device for writing machines, in combination, a platen, means for supporting an adhesive material adjacent the platen and mechanism for forcibly projecting the adhesive material against paper carried by the platen for its adherence to the paper and for stripping the adhering material from the paper.

4. In an erasing device for writing machines, in combination, a platen for supporting paper and against which lines of written matter are produced, means for supporting an adhesive material adjacent the platen, and mechanism for forcibly projecting the adhesive material against paper carried by the platen in register with the lines upon which the written matter is produced and for pulling the adhesive material away from the paper.

5. In an erasing device for writing machines, in combination, a platen, means for supporting a strip of adhesive material adjacent the platen, means for forcibly projecting the strip of adhesive material against paper carried by the platen for its adherence to the paper and for pulling the adhering strip away from the paper and means for shifting the strip in the direction of its length between successive operations of the projecting and pulling means.

JOHN H. BALDWIN.